(12) United States Patent
Mokhtari et al.

(10) Patent No.: US 10,257,652 B2
(45) Date of Patent: Apr. 9, 2019

(54) APPARATUS AND METHOD FOR MAKING INFORMATION AVAILABLE

(71) Applicants: Ramin Lavae Mokhtari, Potsdam (DE); Gerd Ascheid, Aachen (DE)

(72) Inventors: Ramin Lavae Mokhtari, Potsdam (DE); Gerd Ascheid, Aachen (DE)

(73) Assignee: ICE Gateway GmbH, Berlin (DE)

( * ) Notice: Subject to any disclaimer, the term of this patent is extended or adjusted under 35 U.S.C. 154(b) by 0 days.

(21) Appl. No.: 15/297,591

(22) Filed: Oct. 19, 2016

(65) Prior Publication Data

US 2017/0041756 A1    Feb. 9, 2017

Related U.S. Application Data

(63) Continuation of application No. PCT/EP2015/055900, filed on Mar. 20, 2015.

(30) Foreign Application Priority Data

Apr. 30, 2014  (DE) .......... 10 2014 006 234
May 27, 2014  (DE) .......... 10 2014 007 668

(51) Int. Cl.
*H04W 24/00* (2009.01)
*H04W 4/02* (2018.01)
*H04W 76/11* (2018.01)
*H04L 29/08* (2006.01)
*H04B 17/318* (2015.01)
*H04W 72/04* (2009.01)

(52) U.S. Cl.
CPC .......... *H04W 4/025* (2013.01); *H04B 17/318* (2015.01); *H04L 67/025* (2013.01); *H04L 67/12* (2013.01); *H04L 67/125* (2013.01); *H04W 72/044* (2013.01); *H04W 76/11* (2018.02)

(58) Field of Classification Search
CPC ..................................... H04W 4/025
See application file for complete search history.

(56) References Cited

U.S. PATENT DOCUMENTS

2005/0212909 A1* 9/2005 Takehara ............... H04N 5/232
                                                              348/36
2006/0107296 A1* 5/2006 Mock ............... G08B 13/19608
                                                              725/105

(Continued)

FOREIGN PATENT DOCUMENTS

CN     100452868 C     1/2009
CN     101438586 A     5/2009

(Continued)

OTHER PUBLICATIONS

Gerd Ascheid, ICE Gateways, Intelligent light and M2M gateways: A new, attractive partnership for "Smart Cities", 2013, 7 pages, ICE Gateway GmbH.

(Continued)

*Primary Examiner* — Justin Y Lee
(74) *Attorney, Agent, or Firm* — Reinhart Boerner Van Deuren P.C.

(57) ABSTRACT

Disclosed inter alia is a method, comprising: wireless transmitting of transmission information from an apparatus, wherein the transmission information comprises an identifier of the apparatus, and wherein the identifier is associated with a resource.

18 Claims, 4 Drawing Sheets

(56) References Cited

U.S. PATENT DOCUMENTS

| | | | |
|---|---|---|---|
| 2006/0144644 A1* | 7/2006 | Chiba | B66B 1/34 |
| | | | 187/380 |
| 2007/0058634 A1 | 3/2007 | Gupta et al. | |
| 2009/0251314 A1 | 10/2009 | Jiang et al. | |
| 2011/0092185 A1* | 4/2011 | Garskof | G06F 21/35 |
| | | | 455/411 |
| 2014/0009306 A1 | 1/2014 | Haupt et al. | |
| 2014/0047322 A1 | 2/2014 | Kim et al. | |
| 2014/0267740 A1* | 9/2014 | Almomani | H04N 7/186 |
| | | | 348/156 |
| 2015/0043200 A1* | 2/2015 | Wilson | F21S 9/035 |
| | | | 362/145 |

FOREIGN PATENT DOCUMENTS

| | | |
|---|---|---|
| CN | 101 541 123 A | 9/2009 |
| CN | 103297322 A | 9/2013 |
| DE | 203 16 940 U1 | 3/2004 |
| DE | 10 2013 101 170 A1 | 8/2013 |
| DE | 10 2014 102 678 A1 | 12/2014 |
| KR | 10-2011-0100745 A | 9/2011 |

OTHER PUBLICATIONS

IKT.NRW, 4. Day of the information and communication economy of North Rhine-Westphalia, Nov. 20, 2013, 13 pages, Heinz Nixdorf Museumsforum Paderborn, http://2013.iuk-tag-nrw.de/forum.html.

IEEE: Standard for Information Technology-Telecommunications and information exchange between systems—Local and metropolitan area networks—Specific requirements—Part 11: Wireless LAN Medium Access Control (MAC) and Physical Layer (PHY) Specifications, IEEE Std 802.Nov. 2007, Mar. 8, 2007, 538 pages.

Leach et al., Network Working Group, Request for Comments: 4122, A Universally Unique Identifier (UUID) URN Namespace, Jul. 2005, 32 pages, The Internet Society.

* cited by examiner

APPARATUS AND METHOD FOR MAKING INFORMATION AVAILABLE

CROSS-REFERENCE TO RELATED PATENT APPLICATIONS

This patent application is a continuation of PCT/EP2015/055900, filed Mar. 20, 2015, which claims priority to German Application No. 10 2014 006 234.1, filed Apr. 30, 2014, and German Application No. 10 2014 007 668.7, filed May 27, 2014, the entire teachings and disclosure of which are incorporated herein by reference thereto.

FIELD OF THE INVENTION

The present invention relates inter alia to an apparatus and to a method for making information available outdoors.

BACKGROUND OF THE INVENTION

Apparatuses are known in the prior art which immediately provide location-based and dynamic information outside, for example on displays or the like. However, these apparatuses are expensive to setup and maintain. Furthermore, there is a need to receive data from a network for a growing number of mobile sensors and mobile apparatuses. In many cases this is associated with high costs. In addition, the growing demand for data to be transmitted, such as video data and audio data, cannot be met with a constant quality from a network of this kind. In particular, there is a lot of video and audio data which is hardly or rarely changed and only of interest at certain positions. Furthermore, there are many apps, mobile applications, sensors and apparatuses that use conventional GPS signals for positioning. These signals do not meet the growing demand for accuracy outside.

SUMMARY OF SOME EXEMPLARY EMBODIMENTS OF THE PRESENT INVENTION

An object of the present invention is therefore to overcome the drawbacks mentioned above.

This object is achieved by the subject matter of the main claim and the coordinated claims. Advantageous exemplary embodiments according to the invention can be found in the subclaims.

A first method according to the invention comprises wireless transmitting of transmission information, wherein the transmission information comprises an identifier of an apparatus, and wherein the identifier is associated with a resource.

A second method according to the invention comprises providing a resource by a server, wherein the resource is associated with an identifier of an apparatus.

A third method according to the invention comprises wireless receiving of transmission information at a mobile apparatus, wherein the transmission information comprises an identifier of an apparatus, wherein the identifier is associated with a resource.

A fourth method according to the invention comprises the steps of the first, second and/or third method according to the invention.

An apparatus according to the invention comprises means for carrying out and/or controlling the execution of the steps of the first method according to the invention.

The apparatus according to the invention is intended, for example, for use outside. Use outside should, for example, be taken to mean that the apparatus according to the invention is mounted outside. For example, use outside should be taken to mean when the apparatus according to the invention is arranged in or on another apparatus located outside, such as a street light. Outside should be taken to mean, for example, an area (e.g. a public area) outside an enclosed space, such as, for example, streets, paths and squares.

For example, the means of the apparatus according to the invention for carrying out and/or controlling the execution of the steps of the first method according to the invention comprise transmitting means, wherein the transmitting means are adapted to wirelessly transmit the transmission information. For example, the transmitting means comprise communication means such as a wireless communications interface for transmitting the transmission in formation. A wireless communications interface is, for example, an antenna, a wireless communications module (e.g. a wireless network module or a wireless network card) and/or a wireless modem. For example, the wireless communications interface is a wireless network interface.

For example, the means of the apparatus according to the invention for carrying out and/or controlling the execution of the steps of the first method according to the invention are at least partially designed as a hardware module. A hardware module is set up, for example, to carry out one or more logic function(s). The logic functions can be (unchangeably) hard-wired or be fix-programmed in a once-programmable hardware module. The logic functions can be (changeably) programmed in a programmable hardware module (e.g. via firmware and/or software). A hardware module is, for example, an electronic circuit, a processor and/or programmable logic device (PLD).

For example, the means of the apparatus according to the invention for carrying out and/or controlling the execution of the steps of the first method according to the invention comprise at least one processor and one memory having program instructions (for example, a program memory and a main memory), the at least one memory and the program instructions, together with the at least one processor, being adapted to cause the apparatus according to the invention to carry out the steps of the first method according to the invention. For example, the at least one memory and program instructions, together with the at least one processor, are adapted to cause the transmitting means of the apparatus according to the invention to transmit the transmission information wirelessly.

An example of a processor is a general purpose processor, a microprocessor, a micro-control unit such as a microcontroller, a digital signal processor (DSP), an application specific integrated circuit (ASIC: Application-Specific Integrated Circuit], a field-programmable gate array (FPGA] and a processor with an application-specific instruction set (ASIP: Application-Specific Instruction-Set Processor].

A server according to the invention comprises means for carrying and/or controlling the steps of the second method according to the invention.

For example, the means of the server according to the invention for carrying out and/or controlling the steps of the second method according to the invention comprise providing means, wherein the providing means are adapted to provide the resource.

For example, the means of the server according to the invention for carrying out and/or controlling the steps of the method of the second method according to the invention comprise at least one processor and at least one memory with program instructions (for example, a program memory and a main memory), the at least one memory and the program instructions, together with the at least one processor, being adapted to cause the server according to the invention to carry out the steps of the second method according to the invention. For example, the at least one memory and the program instructions, together with the at least one processor, are adapted to cause the providing means of the server according to the invention to provide the resource.

A mobile apparatus according to the invention comprises means for carrying and/or controlling the steps of the third method according to the invention. An example of a mobile apparatus according to the invention is, for example, a suitably adapted user device such as a mobile communications device such as a mobile phone, a portable computer, a tablet computer, or a personal digital assistant. A further example of a mobile apparatus according to the invention is, for example, a vehicle (e.g. a motor vehicle), in particular a self-propelled vehicle (e.g. a drone or an autonomous motor vehicle).

For example, the means of the mobile apparatus according to the invention for carrying out and/or controlling the steps of the third method according to the invention comprise receiving means, with the receiving means being adapted to receive transmission information wirelessly. For example, the receiving comprise communication means such as a wireless communications interface for receiving the transmission information. A wireless communications interface is, as described above, for example, an antenna, a wireless communications module (e.g. a wireless network module or a wireless network card) and/or a wireless modem. For example, the wireless communications interface is a wireless network interface.

For example, the means of the mobile apparatus according to the invention for carrying out and/or controlling the execution of the steps of the third method according to the invention comprise at least one processor and a memory having program instructions (for example, a program memory and a main memory), with the at least one memory and the program instructions, together with the at least one processor, being adapted to cause the mobile apparatus according to the invention to carry out the steps of the third method according to the invention. For example, the at least one memory and the program instructions, together with the at least cause a processor, are adapted to cause the receiving means of the apparatus according to the invention to receive the transmission information wirelessly.

For example, the apparatus in the first, second and third methods according to the invention is in each case the apparatus according to the invention, and the server is in each case the server according to the invention, and the mobile apparatus is in each case the mobile apparatus according to the invention. For example, the first method according to the invention is carried out and/or controlled by the apparatus according to the invention, for example carried out and/or controlled by means of the apparatus according to the invention. For example, the second method according to the invention is carried out and/or controlled by the server according to the invention, for example, carried out and/or controlled by means of the server according to the invention. For example, the third method according to the invention is carried out and/or controlled by the mobile apparatus according to the invention, for example carried out and/or controlled by means of the mobile apparatus according to the invention.

Transmitting of transmission information should, for example, be taken to mean that the transmission information is transmitted in such a way that it can be received by all receivers (e.g. mobile devices and/or user devices such as mobile phones and/or the mobile apparatus according to the invention) that are located within the transmission range of the transmitting means and have the corresponding receiving means. For example, the mobile apparatus according to the invention can, as described above, comprise corresponding receiving means. The transmission range of the transmitting means, is limited, for example, to an area with a radius of less than 500 m around the apparatus according to the invention, preferably with a radius of less than 100 m around the apparatus according to the invention, particularly preferably with a radius of less than 50 m around the apparatus according to the invention.

For example, the transmission information is transmitted in the form of a radio signal, for example in the form of a broadcast signal. For example, the transmission information is transmitted in the form of a radio signal according to a wireless communications protocol. An example of such wireless communications protocols are the IEEE 802 communications protocol such as WLAN (WLAN: Wireless Local Area Network, IEEE 802.11), WiMAX (WiMAX: Worldwide Interoperability for Microwave Access, IEEE 802.16), Bluetooth (802.15.1), Bluetooth Low Energy and Zigbee (IEEE 802. 15.4). A further example of a wireless communications protocol of this kind is RFID (RFID: Radio Frequency Identification). The wireless RFID communications protocol is defined, for example in the standards ISO 10536, ISO 14443, ISO 18000-4 18000-3ISO 15693ISO, ISO 18000-5, ISO 18000-7. A further example of a wireless communications protocol of this kind is NFC (NFC: Near Field Communication). The wireless NFC communications protocol is defined, for example, in the standards ISO 14443, ISO 18092, ISO 21481, ECMA 340, ECMA 352, ECMA 356, ECMA 362 and ETSI TS 102 190). The radio signal comprises the transmission information, for example, as a payload.

For example, the transmission information comprises at least the identifier of the apparatus. For example, the transmission information, in addition to the identifier of the apparatus, comprises further information and/or details.

The identifier of the apparatus is, for example, an identifier that allows identification of the apparatus. For example, the identifier is a unique identifier for the apparatus. For example, the identifier is a name of the apparatus, a geographic position indication of the apparatus, an address of the apparatus or the transmitting means (e.g. a network address such as a Bluetooth address, an IP address or a MAC address) or a serial number. For example, the identifier is what is known as a Universally Unique Identifier as defined, for example, in the document "Request for Comments: 4122" by the Internet Engineering Task Force (IETF).

A resource should, for example, be taken to mean an information resource and/or a source of information which comprises one or more item(s) of information, for example, a source of information containing text, audio, image and/or video information and/or position information. For example, the resource is a resource in a network (e.g. a network resource) which can be accessed over the network. An example of a resource in a network (e.g. a network resource) is a web page (e.g. a web page with text, audio and/or video information).

Providing the resource should, for example, be taken to mean that a mobile apparatus can access the resource and/or information incorporated by the resource (e.g. the resource and/or information incorporated by the resource is/are accessible) and/or the resource and/or information incorporated by the resource can be obtained at the mobile apparatus (for example, the resource and/or information incorporated by the resource is/are obtainable). For example, providing the resource comprises providing the resource and/or information incorporated by the resource for accessing over a network, for example, for retrieving and/or downloading over a network. For example, providing the resource comprises transmitting the resource and/or information incorporated by the resource over a network.

A network can be a local network such as a Local Area Network or a non-local network such as the Internet. A network can be at least partially wireless and/or at least partially wired. An example of a network is a telephone network. An example of a wireless network is a mobile phone network such as a GSM network (GSM: Global System for Mobile Communications), a GPRS network (GPRS: General Packet Radio Service), a UMTS network (UMTS: Universal Mobile Telecommunications System), an LTE network (LTE: Long Term Evolution). A further example of a network is a wireless IEEE 802 network such as a wireless network (WLAN: Wireless Local Area Network, an IEEE 802. 11 network), a WiMAX network (WiMAX: Worldwide Interoperability for Microwave Access, an IEEE 802.16 network), a Bluetooth network (an 802.15.1 network) and a ZigBee network (IEEE 802.15.4 network). An example of a wired network is an Ethernet network such as Power over Ethernet (PoE) network. PoE Plus network and a Universal PoE (UPOE) network.

For example, the resource is provided by the server according to the invention. For example, the server according to the invention is a server in a network such as the Internet. For example, the providing means provide the resource in such a way that the resource can be accessed over the network. For example, the providing means comprise first communication means, wherein the first communication means are adapted to provide the resource for access over the network. For example, the first communication means comprise a communications interface. A communications interface is, for example, an antenna, a wireless and/or a wired communications module (e.g. a network module or a network card) and/or a modem. For example, the communications interface is a network interface.

The identifier should, for example, be understood as being associated with the resource if the resource is at least partially identifiable and/or can be localised depending on the identifier.

For example, the resource provides location-based and dynamic information that is related to the geographic position of the apparatus and/or its vicinity. Users who are in the vicinity of the apparatus can therefore be provided with such location-based and dynamic information without the resource being directly provided by the apparatus. This is advantageous, for example, since appropriate means of providing the resource by way of the apparatus, such as the apparatus according to the invention, do not have to be kept in readiness or updated and maintained. Instead the resource can be provided by a server such as the server according to the invention and/or can be provided by a mobile apparatus such as the mobile apparatus according to the invention. In principle, however, it is also conceivable for the apparatus according to the invention to provide the resource.

A system according to the invention comprises one or more apparatus(es) according to the invention and one or more server(s) according to the invention. For example, the system according to the invention also comprises one or more mobile apparatus(es) according to the invention. For example, the system according to the invention comprises a large number of apparatuses according to the inventions. For example, the system according to the invention comprises means for carrying out and/or controlling the execution of some or all steps of the method according to the invention, in particular the fourth method according to the invention.

An computer program according to the invention comprises program instructions which cause an apparatus to control and/or carry out at least some or cause all the steps of the first, second and/or third inventive method(s) when the computer program according to the invention is carried out by one or more processor(s) of the apparatus. A computer program can, for example, be distributed over a network. A computer program can be at least partially software and/or firmware of a processor. For example, the computer program according to the invention comprises one or more subroutines.

The computer program according to the invention can be stored in a computer-readable storage medium that contains one or more computer program(s) according to the invention and is designed, for example, as a magnetic, an electrical, electromagnetic, optical and/or different type of storage medium. A computer-readable storage medium of this kind is preferably concrete (i.e. "tangible"), for example, it is designed as a data carrier device. A data carrier device of this kind is, for example, portable or permanently installed in a device. Examples of a data carrier device of this kind are volatile or non-volatile memories with random access memory (RAM) such as NOR flash memory, or with sequential access such as NAND flash memory, and/or memory with read-only access (ROM) or read-write access. Computer readable should, for example, be taken to mean that the storage medium can be read (out) and/or described by a computer or a data processing system, for example by a processor.

One use according to the invention is the use of the apparatus according to the invention outside, in particular in or on a lamp outside, in particular in or on a street light. For example, the use of the apparatus according to the invention at a fixed geographic position. The use of the apparatus according to the invention outside is advantageous, for example, to make information, particularly location-based and dynamic information, available in a public area in the simplest possible way.

Exemplary embodiments of the present invention are described below which take into account further exemplary features of the apparatus according to the invention, the server according to the invention, the method according to the invention, the system according to the invention and the computer program according to the invention. In particular, the description of an additional method step of a method according to the invention is also intended to disclose corresponding means for carrying out the step and a corresponding program instruction of the computer program according to the invention which causes an apparatus to carry out the method step when the computer program is executed by a processor of the apparatus. The same should also apply to the disclosure of a means for carrying out a method step or a program instruction, for example, the disclosure of a means for carrying out a method step of the apparatus according to the invention should also be understood as a disclosure of the corresponding method step of the first method according to the invention and a corresponding program instruction of the computer program according to the invention.

In exemplary embodiments of the invention the first method according to the invention comprises capturing vicinity information about the vicinity of the apparatus at the apparatus and/or obtaining vicinity information about the vicinity of the apparatus at the apparatus. For example, the vicinity information is captured by a sensor and obtained from the sensor at the apparatus. For example, the means of the apparatus according to the invention for carrying out and/or controlling the execution of the steps of the first method according to the invention also comprise at least one sensor and/or sensor connecting means.

Vicinity information about the vicinity of the apparatus should, for example, be taken to mean information which can be captured at the geographic position of the apparatus (e.g. can be captured directly or indirectly from the at least one sensor of the apparatus according to the invention). Examples of information about the vicinity of the apparatus are temperature information, brightness information, motion information, sound information, audio information, image information, video information and/or vibration information.

For example, the at least one sensor is adapted to capture vicinity information about the vicinity of the apparatus.

A sensor should, for example, be taken to mean a device (e.g. a video camera) and/or a component (e.g. a CCD sensor and/or a CMOS sensor), in particular an electrical or electronic component, which is adapted to capture specific physical or chemical properties (e.g. radiation, temperature, humidity, pressure, sound, brightness or acceleration) and/or the physical condition of its vicinity qualitatively or quantitatively as a measured variable. This information is captured by the sensor, for example, by means of physical or chemical effects, and converted into an electrical signal and/or data which can be processed further.

For example, the at least one sensor is a temperature sensor (e.g. a thermometer, a thermocouple and/or a thermal resistor), an ambient temperature sensor, a brightness sensor, a motion sensor (e.g. a motion detector), an acoustic sensor, a sound sensor (e.g. a microphone), an ultrasound sensor, an optical sensor, an infrared sensor, a light sensor (e.g. a photodiode and/or a photo-resistor), an image sensor (for example, an image camera, a CMOS sensor and/or a CCD sensor), a video sensor (for example a video camera, a CMOS sensor and/or a CCD sensor), a current sensor, a voltage sensor, a power sensor, a chemical sensor (e.g. a gas sensor), an explosives detection sensor and/or a vibration sensor.

The at least one sensor can be connected to the apparatus, for example, wirelessly and/or in a wired manner. For example, the apparatus according to the invention comprises sensor connecting means such as a data interface and/or an analogue-digital converter. For example, the sensor connection means are adapted to establish a connection to the at least one sensor. An example of a data interface is a USB interface, an IEEE 1394 interface, a CAN bus interface, a Zigbee interface, a Bluetooth interface, a serial interface such as an R232 interface and/or a parallel interface such as a IEEE 1284 interface. For example, the apparatus (e.g. a processor of the apparatus) obtains the vicinity information captured by the sensor from the sensor at least partially as data and/or signals by way of the data interface. For example, the apparatus (e.g. a processor of the apparatus) obtains the vicinity information captured by the sensor from the sensor at least partially as data and/or signals by way of the analogue-to-digital converter. For example, the data interface and/or the analogue-to-digital converter are connected to the sensor (in a wired manner and/or wirelessly).

For example, the vicinity information captured by the at least one sensor and obtained at the apparatus is processed. For example, the vicinity information captured by the sensor and obtained at the apparatus is processed by the apparatus. For example, the means of the apparatus according to the invention for carrying out and/or controlling the execution of the steps of the first method according to the invention comprise processing means, with the processing means being adapted to process the vicinity information captured by the sensor. An example of processing means of this kind is at least one processor, for example at least one processor and a memory having corresponding program instructions, as described above. For example, the apparatus according to the invention comprises at least one processor and one memory having program instructions, with the memory and the program instructions, together with the at least one processor, each being adapted, for example, to cause the processor to process the vicinity information.

Processing of vicinity information should, for example, be taken to mean organizing and/or modifying the vicinity information. For example, processing of vicinity information comprises applying a processing algorithm (e.g. a compression algorithm, an evaluation algorithm and/or a conditioning algorithm) to at least some of the vicinity information. For example, the processing means of the apparatus according to the invention are adapted to apply at least one processing algorithm of this kind to at least some of the vicinity information.

In exemplary embodiments of the invention the first method according to the invention comprises transmitting vicinity information from the apparatus to a server; and the second method according to the invention comprises receiving vicinity information at the server. For example, the vicinity information is transmitted from the apparatus to the server over a network connection. For example, the vicinity information is transmitted from the apparatus to the server over a network connection in a first network. For example, the apparatus is connected directly or indirectly to the server over the network connection in the first network. The first network is, for example, a private and/or a protected network such as a virtual private network (VPN). A private and/or protected network should, for example, be taken to mean a network with which apparatuses can connect only after an authorization and/or authentication and/or in which information will be transmitted encrypted.

For example, the vicinity information is transmitted from the apparatus directly to the server. However, it is also conceivable for the vicinity information to be transmitted indirectly from the apparatus to the server (for example via one or more further server(s)).

For example, the means of the apparatus according to the invention for carrying out and/or controlling the execution of the steps of the first method according to the invention comprise communication means, with the communication means being adapted to transmit information (e.g. the vicinity information to a server such as the server according to the invention); and the means of the server according to the invention for carrying out and/or controlling the execution of the steps of the second method according to the invention comprise, for example, second communication means, with the second communication means being adapted to receive information (e.g. the vicinity information from an apparatus such as the apparatus according to the invention).

For example, the communication means of the apparatus according to the invention are at least partially different from the above-described transmitting means of the apparatus according to the invention. For example, the communication means of the apparatus according to the invention are adapted to transmit information to the server over a network (e.g. via a network connection). For example, the communication means of the apparatus according to the invention are adapted to transmit information to the server over a wireless network. For example, the communication means comprise a communications interface. A communications interface is, for example, an antenna, a wireless and/or a wired communications module (for example, a network module, or a network card) and/or a modem. For example, the communications interface is a network interface (such as a wireless network interface).

For example, the second communication means of the server according to the invention are adapted to receive the information from the apparatus over a network (for example over a network connection). For example, the second communication means comprise a communications interface. A communications interface is, for example, an antenna, a wireless and/or wired communications module (e.g. a network module or a network card) and/or a modem. For example, the communications interface is a network interface. The first communication means, described above, of the server according to the invention correspond, for example, to the second communication means of the server according to the invention. However, it is also conceivable for the first communication means of the server according to the invention to be different from the second communication means of the server according to the invention.

For example, the apparatus according to the invention and the server according to the invention, as described above, each comprise at least one processor and one memory having program instructions, with the memory and the program instructions each being adapted, together with the at least one processor, for example, to cause the respective communication means to transmit and/or receive the information.

For example, the vicinity information transmitted from the apparatus to the server is based at least partially on the vicinity information about the apparatus captured and/or obtained at the apparatus. The transmitted vicinity information is based, for example, on the captured and/or obtained vicinity information about the vicinity of the apparatus, if it at least partially comprises the captured and/or obtained vicinity information about the apparatus in processed or unprocessed form. For example, the vicinity information transmitted from the apparatus to the server comprises the vicinity information about the vicinity of the apparatus captured by the at least one sensor at least partially in an unprocessed form (e.g. in the form output by the sensor). For example, the vicinity information transmitted from the apparatus to the server comprises the vicinity information about the vicinity of the apparatus captured by the at least one sensor at least partially in a processed form (e.g. in compressed and/or analysed form).

For example, the resource associated with the identifier is provided by the server (e.g. the server according to the invention).

For example, the resource is provided by the server at least partially depending on the information received at the server (e.g. the vicinity information). For example, the above-described providing means of the server according to the invention are adapted to provide the resource at least partially depending on the information received from the apparatus. For example, the resource is provided in such a way that information incorporated by the resource is adjusted at least partially depending on the information received from the apparatus, in particular vicinity information about the vicinity of the apparatus. For example, the information incorporated by the resource is adjusted in such a way that when bad weather (e.g. precipitation) is detected in the vicinity of the apparatus, the resource comprises other information than if good weather (e.g. no precipitation) is detected in the vicinity of the apparatus. This is advantageous, for example, to be able to adjust the resource and the information incorporated by the resource to the situation in the vicinity of the apparatus and to be able to dynamically adjust location-based information and make it available.

The information of the resource can therefore be dynamically adjusted depending on the vicinity information captured by the at least one sensor. This is advantageous, for example, to enable dynamic content management and Sensor Specific Dynamic Contents.

For example, the resource associated with the identifier is provided by the server (e.g. the server according to the invention) in such a way that it can be retrieved over a second network. The second network is, for example, a network different from the first network. For example, the second network is a public and/or unprotected network such as the Internet. A public and/or unprotected network should, for example, be taken to mean a network to which apparatuses can connect without prior authorization and/or authentication and/or in which information can be transmitted unencrypted.

In exemplary embodiments of the invention the transmission information is transmitted and/or received according to a wireless communications protocol. For example, the transmitting means, described above, of the apparatus according to the invention are adapted to transmit the transmission information according to the wireless communications protocol. For example, the receiving means described above are adapted to receive the transmission information according to the wireless communications protocol. Some non-exhaustive examples of wireless communications protocols are given above.

For example, the communication means of the apparatus according to the invention work according to a different communications protocol to the transmitting means of the apparatus according to the invention.

In exemplary embodiments of the invention the transmission information is transmitted in the form of a radio signal, in particular in the form of a broadcast signal, a radio beacon signal, a beacon signal (e.g. an iBeacon signal), a Bluetooth signal, an RFID signal, a NFC signal or a FCN signal emitted. For example, the transmitting means of the apparatus according to the invention are adapted to transmit transmission information in the form of a radio signal, in particular in the form of a broadcast signal, a radio beacon signal, a beacon signal (e.g. an iBeacon signal), a Bluetooth signal, an RFID signal, a NFC signal or a signal FCN. For example, the transmitting means comprise a Bluetooth transmitter, an iBeacon transmitter, a beacon transmitter, an RFID transmitter, an NFC transmitter and/or a FCN transmitter.

For example, the transmission information comprises a signal strength indication, wherein the signal strength indication depends on the signal strength of the radio signal. For example, the radio signal is transmitted with a constant signal strength. For example, the signal strength indication indicates the signal strength and/or magnitude of the signal strength of the wireless signal with which the transmission information is transmitted. For example, the signal strength indication indicates the signal strength and/or magnitude of the signal strength of the radio signal at a predefined distance from the apparatus (e.g. at a distance of 5 m, preferably 3 m, particularly preferably 1 m). The signal strength of the radio signal should, for example, be taken to mean the power of the radio signal (for example, the transmitting and/or receiving power of the radio signal).

This is advantageous, for example, to be able to support determination of the position of a mobile apparatus, such as the mobile apparatus according to the invention, which receives the transmission information.

In exemplary embodiments of the invention the transmission information is transmitted at regular intervals. However, it is also conceivable for the transmission information to be transmitted at irregular intervals. For example, the transmitting means are adapted to transmit the transmission information at regular and/or irregular intervals.

In exemplary embodiments of invention the identifier is a unique identifier of the apparatus (e.g. the apparatus according to the invention).

In exemplary embodiments of the invention, the identifier is a Universally Unique Identifier. For example, the identifier, as described above, is what is known as a Universally Unique Identifier as is defined in the document "Request for Comments: 4122" of the Internet Engineering Task Force.

In exemplary embodiments of the invention the identifier is associated with the resource by way of an entry in a database.

For example, the identifier is associated with the resource by way of an entry in a database, which, in addition to the identifier, comprises a reference for identifying and/or localising the resource. For example, the database is adapted in this case in such a way that, in response to a request with the identifier directed to the database, the database outputs the resource or a reference to the resource associated with the identifier. An example of a reference for identifying and/or localising the resource is a network address of the resource, a link to the resource, or a URL (Uniform Resource Locator) of the resource.

However, it is also conceivable for the identifier to be associated with the resource, for example, by way of an entry in a database, which comprises the resource in addition to the identifier. For example, the database in this case is adapted in such a way that, in response to a request with the identifier directed to the database, the database outputs the resource associated with the identifier.

For example, one of the databases described by way of example above is provided by a server (for example, a service server and/or the server according to the invention), for example by a server in a network such as the Internet. It is consequently possible for any Internet-capable mobile apparatuses, such as the mobile apparatus according to the invention, to be able to identify and/or localise the resource depending on the identifier. For example, a suitable mobile apparatus, when it receives the transmission information transmitted by the transmitting means, can direct a corresponding request with the identifier of the apparatus according to the invention incorporated by the transmission information to the database via the Internet. Subsequently, the mobile apparatus can access, for example via the Internet, the resource associated with the identifier. Since the transmission information can only be received by mobile apparatuses within the transmission range of the transmitting means, this is advantageous, for example, in ensuring that, for example, only users with the appropriate mobile apparatuses that are in the vicinity of the apparatus according to the invention bounded by the transmission range of the transmitting means described above can access the resource.

However, it is also conceivable for one of the above-described exemplary databases to be provided by a mobile apparatus such as the mobile apparatus according to the invention. This is advantageous, for example, in order to be able to localise and/or identify the resource by way of a local request to a local database. A network connection is therefore not necessary for access to the resource.

In exemplary embodiments of the invention the resource comprises position information about the position of the apparatus. Position information should, for example, be taken to mean information that allows the position of the apparatus to be determined. For example, the position information comprises a position indication of the geographical position of the apparatus. An example of a position indication of this kind is an address of the apparatus and/or geographical coordinates of the apparatus.

For example, a position database comprises an entry with the identifier of the apparatus and the position information about the position of the apparatus. For example, for a large number of apparatuses the position database comprises one entry in each case with the identifier of the respective apparatus and the position information about the position of the respective apparatus. For example, the position database is adapted in such a way that, in response to a request with the identifier of the apparatus directed to the database, the position database outputs the resource associated with the identifier, i.e. the position information about the position of the apparatus.

Since the transmission information can, for example, only be received by mobile apparatuses, such as the mobile apparatus according to the invention, within the transmission range of the transmitting means, this is advantageous, for example, in order to be able to support determination of the position of the mobile apparatus by way of the mobile apparatus.

In exemplary embodiments of the invention the resource comprises information dependent on the location and/or the vicinity of the apparatus (e.g. the information incorporated by the resource is location- and/or vicinity-dependent).

Information dependent on the location of the apparatus is, for example, information which is related to the location of the apparatus. This can be, for example, information about an object (e.g. a monument and/or a building) which is found at the location of the apparatus and/or in the vicinity of the apparatus (e.g. within the transmission range).

Information dependent on the vicinity of the apparatus is, for example, dynamic information that changes depending on the vicinity (e.g. the environment) of the apparatus. For example, the resource, as described above, can be provided depending on vicinity information about the vicinity of the apparatus.

This is advantageous, for example, in order to be able to make location-dependent and/or vicinity-dependent dynamic information available in the vicinity of the apparatus (e.g. within the transmission range) without this information having to be provided directly by the apparatus.

In exemplary embodiments of the invention the resource is a resource in a network. For example, the resource can be identified and/or localised in the network by a URL. For example, the resource can be accessed over the network.

In exemplary embodiments of the invention the resource is a web page. For example, the resource is a web page in a local network or a non-local network such as the Internet.

In exemplary embodiments of the invention the third method according to the invention comprises identifying and/or localising the resource associated with the identifier at least partially depending on the identifier.

As described above, the resource can be identified and/or localised, for example, by a request with the identifier to a database. For example, the identifier is associated with the resource by way of an entry in a database, which, in addition to the identifier, comprises a reference for identifying and/or localising the resource. For example, the database is adapted in this case in such a way that, in response to a request with the identifier directed to the database, the database outputs a reference to the resource associated with the identifier. An example of a reference for identifying and/or localising the resource is a network address of the resource, a link to the resource, or a URL (Uniform Resource Locator) of the resource.

In exemplary embodiments of the invention the third method according to the invention comprises accessing the resource associated with the identifier by the mobile apparatus.

For example, the means of the mobile apparatus according to the invention for carrying out and/or controlling the execution of the steps of the third method according to the invention comprise access means, with the access means being adapted to access the resource associated with the identifier. For example, the access means comprise communication means such as a network interface for receiving the resource associated with the identifier over a network.

Accessing a resource should, for example, be taken to mean that the resource and/or information incorporated by the resource is/are at least partially obtained at the mobile apparatus according to the invention.

The resource can be provided, for example, by the mobile apparatus according to the invention. For example, the resource and/or information incorporated by the resource can, as described above, be obtained at the mobile apparatus, for example, in response to a request with the identifier directed to a database of the mobile apparatus (e.g. a position database of the mobile apparatus).

The resource can, as described above, be provided for example by the server, for example, in a network. For example, the resource and/or information incorporated by the resource can be obtained from the server (e.g. retrieved, downloaded and/or received from the server) in response to a corresponding request for the resource to the server. For example, the resource and/or information incorporated by the resource can be obtained from the server (e.g. retrieved, downloaded and/or received from the server) at the mobile apparatus according to the invention via a connection over a network. Accessing a resource can comprise, for example, transmitting a request for the resource and receiving the resource and/or information incorporated by the resource in response to the request. An example of a request is an HTTP GET request with the URL of the resource in accordance with the hypertext transfer protocol (HTTP, Hypertext Transfer Protocol). For example, the URL localises and/or identifies the resource in a network.

In exemplary embodiments of the invention the third method according to the invention comprises determining the position of the mobile apparatus at least partially depending on the transmission information.

For example, the means of the mobile apparatus according to the invention for carrying out and/or controlling the execution of the steps of the third method according to the invention comprise position determining means, with the position determining means being adapted to determine the position of the mobile apparatus at least partially depending on the transmission information.

Determining the position of the mobile apparatus at least partially depending on the transmission information should, for example, be taken to mean that the position of the mobile apparatus is at least partially determined depending on the information incorporated by the resource (e.g. position information about the position of the apparatus), with the identifier incorporated by the transmission information being associated with the resource. As described above, the resource associated with the identifier of the apparatus can, for example, comprise position information about the position of the apparatus. For example, the identifier localises and/or identifies this position information in such a way that the mobile apparatus can access the position information. For example, the position of the mobile apparatus is at least partially determined depending on the position information about the position of the apparatus that can be localised and/or identified by the identifier. For example, the position of the mobile apparatus is determined in such a way that the mobile apparatus is at the position of the apparatus and/or in the vicinity around the position of the apparatus. The vicinity is limited, for example, by the transmission range of the transmitting means of the apparatus described above. Since the transmission information can be received, for example, only within the transmission range of the transmitting means described above, the position of the mobile apparatus can be restricted at least to the vicinity around the position of the apparatus limited by the transmission range of the transmitting means.

Determining the position of the mobile apparatus at least partially depending on the transmission information should, for example, also be taken to mean that the position of the mobile apparatus is at least partially determined depending on a signal strength indication incorporated by the transmission information. As described above, the signal strength indication indicates, for example, the signal strength and/or magnitude of the signal strength of the radio signal with which the transmission information is transmitted. For example, the signal strength indication indicates the signal strength and/or magnitude of the signal strength of the radio signal at a predefined distance from the apparatus (e.g. at a distance of 5 m, preferably 3 m, particularly preferably 1 m). A signal strength indication with a magnitude indication of the signal strength indicates, for example, a range of values in which the signal strength is located. For example, the magnitude indication corresponds to a specific range of values (e.g. a predefined range of values between a maximum and a minimum signal strength).

For example, at the mobile apparatus the signal strength and/or a magnitude of the signal strength of the radio signal is determined with which the transmission information is received at the mobile apparatus. For example, the above-described receiving means of the mobile apparatus according to the invention are adapted to determine (e.g. to measure) a signal strength and/or magnitude of the signal strength of the radio signal with which the transmission information is received at the mobile apparatus. As described above, the signal strength of a radio signal should, for example, be taken to mean the power of the radio signal. The signal strength indication of a received radio signal is referred to, for example, as RSSI (RSSI, Received Signal Strength Indication) (e.g. in some Bluetooth communications protocols).

For example, the position of the mobile apparatus is at least partially determined depending on the signal strength indication incorporated by the transmission information and the specific signal strength and/or the specific magnitude of the signal strength of the wireless signal with which the transmission information is received at the mobile apparatus, with the signal strength and/or the magnitude of the signal strength of the radio signal being determined at the mobile apparatus (e.g. by the receiving means of the mobile apparatus according to the invention). For example, the distance of the mobile apparatus from the apparatus is determined depending on the signal strength indication incorporated by the transmission information and of the specific signal strength and/or the specific magnitude of the signal strength of the radio signal. For example, the position of the mobile apparatus is determined in such a way that the mobile apparatus is located around the position of the apparatus at a position with an appropriate distance from the position of the apparatus. When radio signals with transmission information are received from other apparatuses, the position of the mobile apparatus can be restricted further accordingly.

Determining the position of the mobile apparatus is advantageous, for example, to assist with and/or enable navigation of the mobile apparatus (e.g. a vehicle such as a self-propelled vehicle). This is advantageous, in particular, in a system according to the invention such as a lighting system of a city using a large number of apparatuses according to the invention. Self-propelled vehicles such as, for example, drones could then navigate, for example, along the large number of apparatuses according to the invention.

Furthermore, determining the location of the mobile apparatus is advantageous, for example, in order to be able to provide the user of the mobile apparatus with dynamic vicinity-dependent and/or location-dependent information adjusted to the position of the mobile apparatus. This can be, for example, advertising information for watches when the user is using the mobile apparatus in front of a watch shop. It may also be traffic information, for example, however, if the user is using the mobile apparatus on a pavement of a street. Highly targeted information can be automatically provided therefore, which is at least highly likely to be of interest to the user of the mobile apparatus, whereas other information, which is at least highly likely to be of no interest to the user of the mobile apparatus, is not automatically provided. For example, the volume of information to be provided can consequently be reduced and the transmission bandwidth reduced.

In exemplary embodiments of the invention the inventive apparatus is part of an apparatus for controlling a lamp of a light outside, in particular a street light. An apparatus of this kind for controlling a lamp of a light outside is described, for example, in the patent application with file reference DE 10 2014 102 678.0, which is hereby expressly incorporated by reference. Furthermore, an apparatus of this kind is, for example, an apparatus manufactured by the company ICE Gateway under the product name ICE gateway.

For example, the first method according to the invention also comprises controlling one or more lamp(s) connected to the apparatus. For example, the apparatus according to the invention comprises processing means, with the processing means being adapted to control one or more lamp(s) connected to the apparatus. For example, the apparatus according to the invention comprises, as described above, at least one processor and a memory having program instructions, with the memory and the program instructions being adapted, together with the least one processor, for example, to cause for causing the apparatus according to the invention to control one or more of the lamp(s) connected to the apparatus according to the invention.

Controlling a lamp (e.g. a lamp connected to the apparatus) should, for example, be taken to mean turning on, turning off and/or dimming the lamp.

For example, the apparatus according to the invention also comprises one or more power supply means. For example, the power supply means are adapted to be connected to the lamps and to supply the lamps with energy and/or power to operate the lamps. For example, the lamps are controlled by the power supply means being controlled.

For example, the power supply means comprise a power converter, a controllable driver circuit and/or a controllable voltage transformer (e.g. a controllable DC converter).

For example, the lamps are controlled at least partially depending on the vicinity information. For example, the lamps are switched on or their brightness is increased in the case of specific vicinity information (for example in low ambient light) and are switched off or dimmed in the case of other vicinity information (for example in bright ambient light). As described above, the vicinity information can be processed. For example, the lamps are controlled at least partially depending on the result of this processing.

For example, an apparatus for controlling a lamp is consequently provided with additional functions, such as transmitting the transmission information. This is advantageous, for example, since no additional installation effort has to be made for the provision of the additional functions, for example, and the existing resources of the apparatus can be used for controlling the lamp. For example, no additional sensor has to be provided for the additional function (e.g. for capturing the vicinity information). Apparatuses of this kind for controlling a lamp are also typically part of a lighting system (e.g. a lighting system of a town), comprising a large number of apparatuses for controlling a lamp, so a large public area can be covered thereby.

In exemplary embodiments of the invention the inventive apparatus can be arranged or is arranged on or in a lamp outside, in particular a street light. For example, the apparatus according to the invention is part of a lighting apparatus such as a light, for example, a light outside, in particular a street light.

Arranged on or in a light outside should, for example, be taken to mean that the apparatus according to the invention is mounted inside the light (e.g. in the light head or the mast) and/or on the housing of the light (e.g. on the light head and/or the mast). For example, the apparatus according to the invention is arranged in the light, on or at the light, in the street light and/or on the street light.

This is advantageous, for example, since lights outside have a stationary geographic position and location-based and dynamic information can therefore be provided at this stationary geographic position by the invention.

In exemplary embodiments of the invention the apparatus according to the invention is part of a gateway for outside, such as an outdoor gateway.

In exemplary embodiments of the invention the apparatus according to the invention is part of a controller for outside.

In exemplary embodiments of the invention the transmission information comprises further information and/or details in addition to the identifier of the apparatus. For example, the transmission information comprises local information which is highly likely to be of interest to and can be received by all receivers or at least a large proportion of the receivers (e.g. mobile apparatuses and/or user apparatuses such as mobile phones and/or the mobile apparatus according to the invention) which are located within the transmission range of the transmitting means and which have appropriate receiving means.

At a station, local information can be, for example, departure, arrival and/or delay information. At an airport, local information can be, for example, departure, arrival and/or delay information. The local information can be, for example, hazard information, e.g. information about a fire, a crime and/or an accident in the vicinity of the apparatus. For example, it is also conceivable for local information to be vicinity map information, e.g. information about a map and/or a representation of a map of the vicinity of the apparatus (e.g. a company site and/or event site).

This embodiment is advantageous, for example, in order to (simultaneously) provide all receivers within the transmission range of the transmitting means of the apparatus with local information without the receiver having to request this information specifically.

In exemplary embodiments according to the invention the first method according to the invention comprises transmitting control information to an external apparatus and/or receiving response information from the external apparatus. For example, the apparatus according to the invention comprises means, such as a communications interface, that are adapted to transmit the control information and/or to receive the response information.

For example, the apparatus according to the invention receives the control information from a controller (e.g. a central controller) and transmits the control information to the external apparatus on. For example, the apparatus according to the invention transmits the received response information on to the controller.

However, it is also conceivable for the apparatus according to the invention to at least partially generate the control information, for example, to at least partially generate it at least partially depending on the vicinity information. For example, the apparatus according to the invention comprises means such as processing means, with the processing means being adapted to generate the control information, for example, to at least partially generate it at least partially depending on the ambient information.

For example, the control information is transmitted over a wireless network, and the response information is received over the wireless network. For example, the external apparatus is connected to the apparatus according to the invention over a wireless network connection. It is also conceivable for a plurality of external apparatuses to be connected to the apparatus according to the invention via a respective wireless network connection. An example of a network is a wireless IEEE 802 network such as WLAN network, a WiMAX network, a Bluetooth network and a Zigbee network.

For example, the external apparatus is an apparatus for controlling a lamp of a light outside, a kiosk terminal (e.g. an information terminal and/or a self-service terminal), a panel (e.g. a digital panel) and/or a display (e.g. a digital and/or remote-controlled display such as a digital and/or remote-controlled information display, a digital and/or remote-controlled advertising display, a digital and/or remote-controlled traffic display and/or a digital and/or remote-controlled traffic sign).

The present invention supports a large number of applications in the Internet of Everything (IOE) and in the Infrastructure as a Service (IAAS) sector.

Further advantageous exemplary embodiments of invention can be found in the following detailed description of some exemplary embodiments of the present invention, in particular in connection with the figures.

However, the figures accompanying the application should only be for the purpose of illustration and not for determining the scope of the invention. The accompanying drawings are not to scale and are only intended to reflect the general concept of the present invention by way of example. In particular, features that are included in the figures should in no way be considered as a necessary component of the present invention.

DETAILED DESCRIPTION OF SOME EXEMPLARY EMBODIMENTS OF THE PRESENT INVENTION

The present invention will be described below with reference to exemplary embodiments.

Figure 1A:
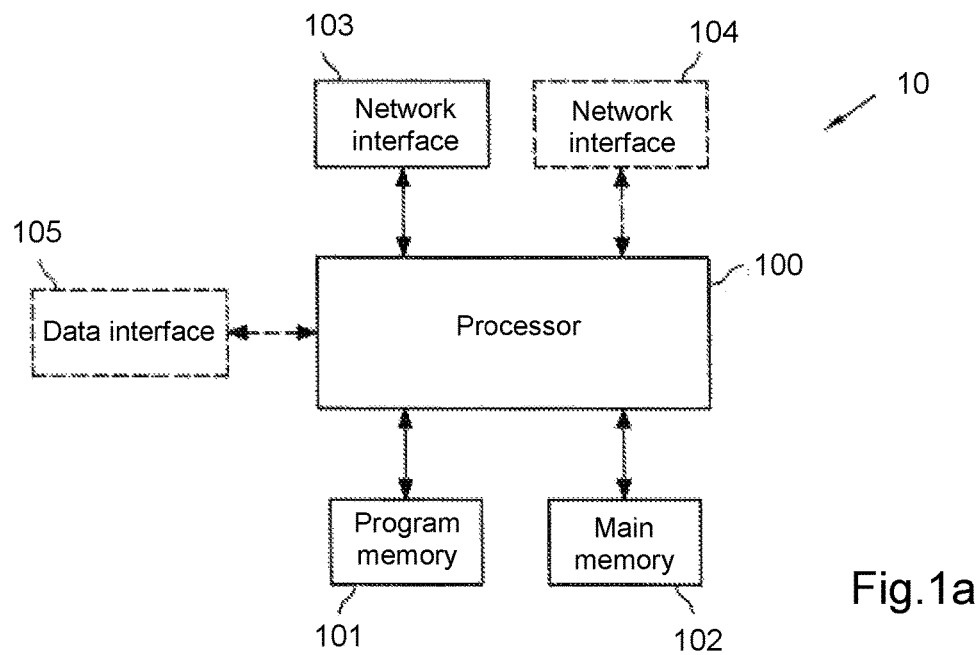
FIG. 1a shows a block diagram of an exemplary embodiment of the apparatus according to the invention.

FIG. 1a shows a block diagram of an exemplary embodiment of the apparatus 10 according to the invention.

The apparatus 10 according to the invention comprises a processor 100, a program memory 101, a main memory 102, a first network interface 103, an optional second network interface 104 and an optional data interface 105.

An example of a processor is a general purpose processor, a microprocessor, a micro-control unit such as a microcontroller, a digital signal processor (DSP), an application specific integrated circuit (ASIC), a Field Programmable Gate Array (FPGA) and a processor having an application-specific instruction set (ASIP).

The processor 100 of the apparatus 10 according to the invention executes, for example, program instructions of a program stored in the program memory 101 and stores interim results and the like in the main memory 102. For example, a computer program according to the invention is stored in the program memory 101.

A network interface comprises, for example, a network card, an antenna, a network module and/or modem and is adapted, for example, to transmit and/or to receive information (e.g. data) in accordance with a communications protocol (e.g. to transmit and/or receive over a network).

For example, the processor 100 of the apparatus 10 according to the invention controls the first network interface 103, and the optional second network interface 104, with control of the network interfaces being enabled, for example, by program instructions of a program (e.g. the computer program according to the invention) which is stored in program memory 101.

The first network interface 103 can receive, for example, information (e.g. data) in accordance with a first communications protocol and forward it to the processor 100 and/or receive information from the processor 100 and transmit it in accordance with the first communications protocol. The optional second network interface 104 can receive, for example, information in accordance with a second communications protocol and forward it to the processor 100 and/or receive information from the processor 100 and transmit it in accordance with the second communications protocol.

The first network interface 103 is, for example, adapted to transmit a radio signal according to the first communications protocol with a limited transmission range. The first communications protocol is, for example, a Bluetooth communications protocol and the second communications protocol is, for example, a mobile communications protocol (e.g. a GSM, UMTS and/or LTE communications protocol).

An example of a data interface is a USB interface, an IEEE 1394 interface, a CAN bus interface, a Zigbee interface, a Bluetooth interface, a serial interface such as an R232 interface and/or a parallel interface such as an IEEE 1284 interface.

For example, the optional data interface 105 is a wired data interface. For example, the processor 100 controls the optional data interface 105. The optional data interface 105 can, for example, receive information from at least one sensor connected to the data interface 105 and forward it to the processor 100 and/or receive information from the processor 100 and forward it to the at least one sensor connected to the data interface 105.

For example, the processor 100, program memory 101, main memory 102, first network interface 103, optional second network interface 104 and the optional data interface 105 are at least partially part of a hardware module. For example, at least the processor 100, program memory 101, main memory 102 and first network interface 103 are at least partially part of a hardware module of this kind. A hardware module is, for example, adapted to carry out one or more logic functions. The logic functions can be (unchangeably) hard-wired or be fix-programmed in a once-programmable hardware module. The logic functions can be (changeably) programmed in a programmable hardware module (e.g. via firmware and/or software). A hardware module is, for example, an electronic circuit, a processor and/or a programmable logic device (PLD).

The at least one sensor connected to the optional data interface 105 can, for example, capture vicinity information about the vicinity of the apparatus 10 and transmit it to the data interface 105. For example, the at least one sensor is a temperature sensor.

The apparatus 10 is, for example, an apparatus for controlling a lamp outside. The apparatus 10 is, for example, an apparatus for controlling a lamp in a street light. For example, the apparatus 10 is used for converting or retrofitting street lights with a conventional light to/with an LED light. For example, the apparatus 10 is used in street lights.

Figure 1B:
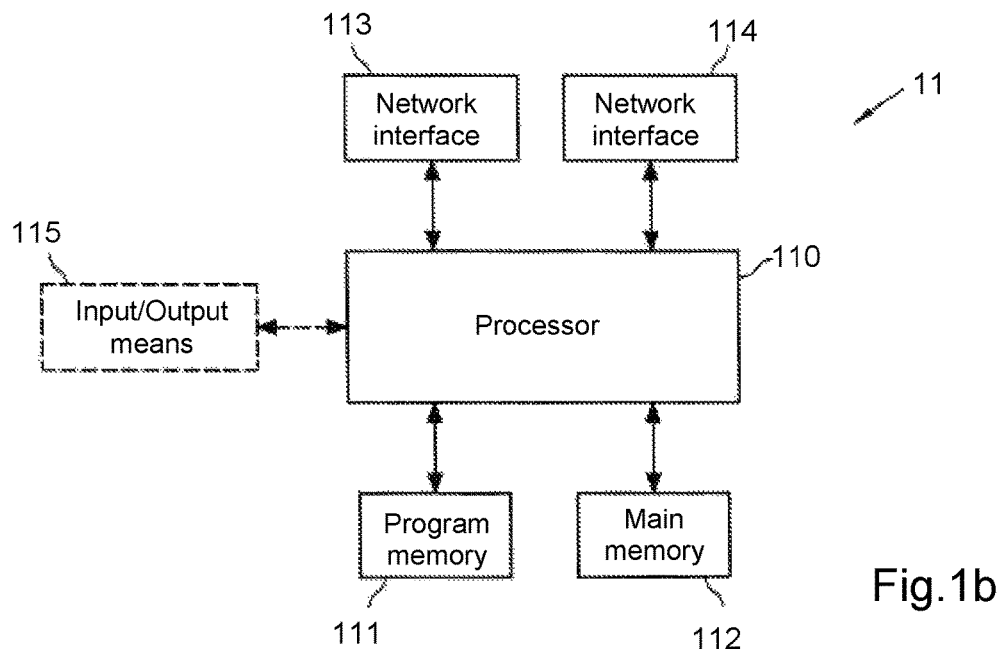
FIG. 1b shows a block diagram of an exemplary embodiment of the mobile apparatus according to the invention.

FIG. 1b shows a block diagram of an exemplary embodiment of the mobile apparatus according to the invention 11.

The mobile apparatus 11 comprises a processor 110, a program memory 111, a main memory 112, a first network interface 113, a second network interface 114 and optional input/output means 115. The mobile apparatus 11 is, for example, a mobile user device such as a mobile phone (for example, a smartphone).

The processor 110 of the mobile apparatus 11 executes, for example, program instructions of a program stored in a program memory 111 and stores interim results and the like in the main memory 112. For example, a computer program according to the invention is stored in the program memory 111.

For example, the processor 110 of the user apparatus 11 controls the first network interface 113, second network interface 114 and optional input/output means 115, with the controller being enabled, for example, by program instructions of a program (e.g. the computer program according to the invention) which is stored in the program memory.

The first network interface 113 can receive, for example, information (e.g. data) according to the first communications protocol and forward it to the processor 110 and/or receive information from the processor 110 and transmit it according to the first communications protocol. The second network interface 114 can, for example, receive information according to a second communications protocol and forward it to the processor 110 and/or receive information from the processor 110 and transmit it according to the second communications protocol. The first communications protocol is, for example, a Bluetooth communications protocol and the second communications protocol is, for example, a mobile communications protocol (e.g. a GSM, UMTS and/or LTE communications protocol).

An example of an input/output means is a (numeric or alpha-numeric) keyboard, mouse, screen, touch screen, speaker and/or microphone.

The optional input/output means 115 can, for example, receive information input by a user of the mobile apparatus 11 and forward it to the processor 110 and/or receive information from the processor 110 and output to a user of the mobile apparatus 1.

Figure 1C:
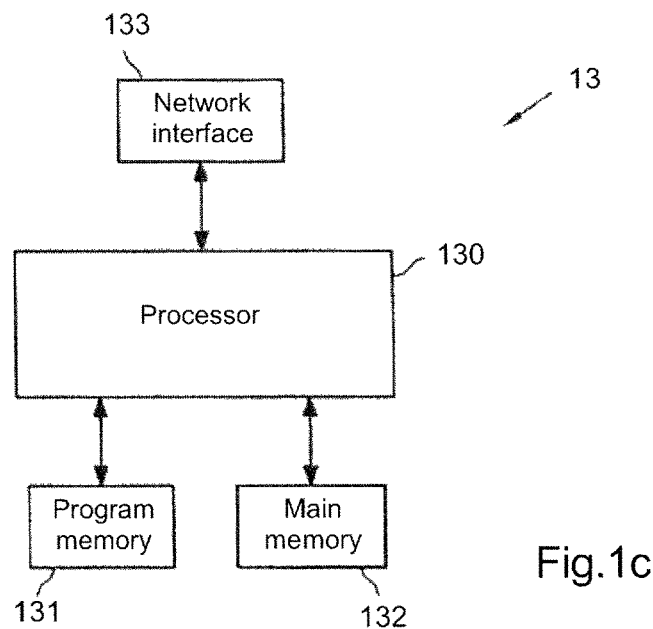
FIG. 1c shows a block diagram of an exemplary embodiment of the server according to the invention.

FIG. 1c shows a block diagram of an exemplary embodiment of the server according to the invention 13.

The server according to the invention 13 comprises, for example, a processor 130, program memory 131, main memory 132 and network interface 133.

The processor 130 of the server 13 according to the invention executes, for example, program instructions of a program stored in a program memory 131 and stores interim results and the like in the main memory 132. For example, a computer program according to the invention is stored in the program memory 131, For example, the processor 131 of the server 13 according to the invention controls the network interface 133, wherein the controller of the network interface 133 is enabled, for example, by program instructions of a program (e.g. the computer program according to the invention) which is stored in the program memory 131.

The network interface 133 can, for example, receive information (e.g. data) over a network (e.g. the Internet) and forward it to the processor 110 and/or receive information from the processor 110 and transmit it over the network.

Figure 2:
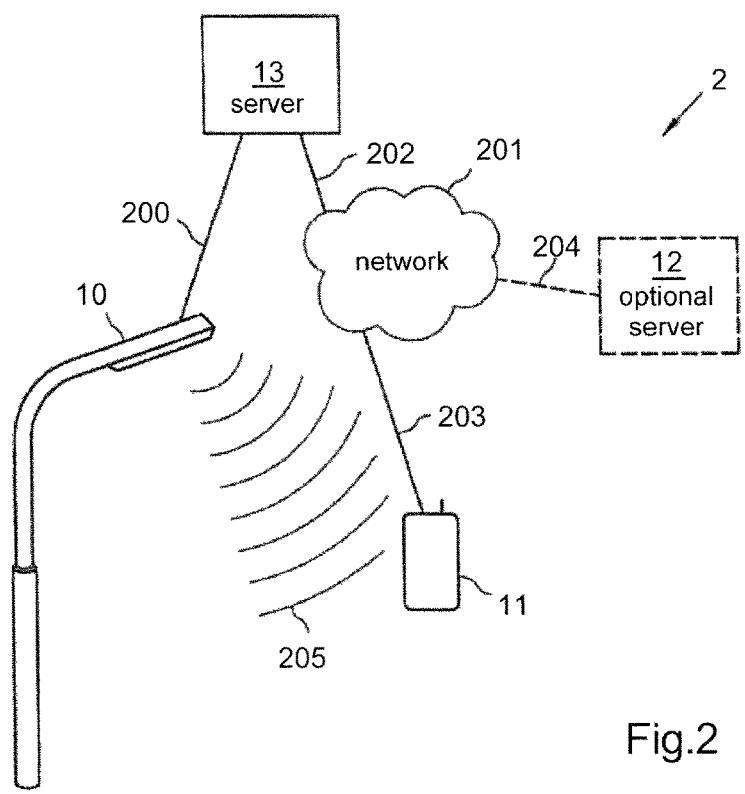
FIG. 2 shows a block diagram of an exemplary embodiment of the system according to the invention.

FIG. 2 shows a block diagram of an exemplary embodiment of the system 2 according to the invention. The system 2 comprises, for example, the apparatus 10 according to the invention, the mobile apparatus 11 according to the invention, an optional server 12 and the server 13 according to the invention The construction of the optional server 12 matches, for example, the construction of the server 13 according to the invention shown in FIG. 1c.

As shown in FIG. 2, the apparatus according to the invention 10 is arranged on or in a street light. For example, the apparatus according to the invention is part of an apparatus for controlling a lamp of the street light.

The apparatus 10 is connected to the server 13 via a connection 200. The connection 200 is, for example, a connection in a private network (for example, a connection over a virtual private network, VPN). It is conceivable, for example, for the connection 200 to be a connection over the network 201 (e.g. the Internet). For example, the connection 200 is between the second network interface 104 of the apparatus 10 and the network interface 133 of the server 13, for example, these network interfaces provide the connection 200. For example, the connection 200 is at least partially a wireless connection and/or at least partially a wired connection.

The server 13 is connected to the network 201 via a connection 202, the mobile apparatus 11 is connected to the network 201 via a connection 203, and the optional server 12 is connected to the network 201 via a connection 204. Connections 202, 203 and 204 are, for example, at least partially wireless connections and/or at least partially wired connections. Connections 202, 203 and 204 are provided, for example, by the respective network interfaces (for example, inter alia, the network interfaces 113 and 133).

The network 201 is, for example, a wide area network (WAN, Wide Area Network) or a global network (GAN, Global Area Network) such as the Internet.

Mobile apparatus 11 is located, as schematically shown in FIG. 2, within the transmission range of a radio signal 205 transmitted by the first network interface 103 of the apparatus 10.

Figure 3:
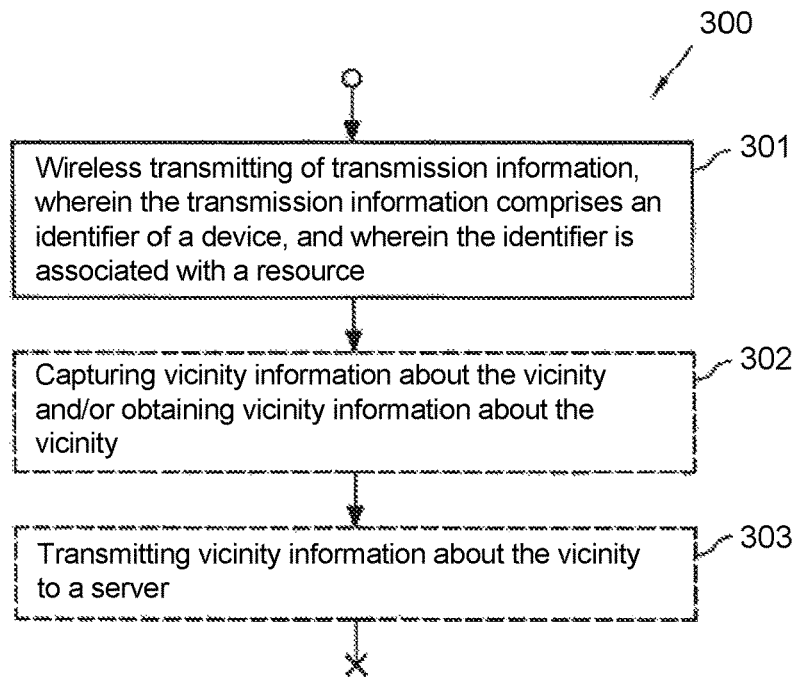
FIG. 3 shows a flow diagram with steps of an exemplary embodiment of the first method according to the invention.

FIG. 3 shows a flow diagram 300 with steps of an exemplary embodiment of the first method according to the invention, which are carried out and/or controlled by the means of the apparatus 10 according to the invention.

In a step 301 transmission information is transmitted wirelessly, wherein the transmission information comprises an identifier of an apparatus, and the identifier being associated with a resource. For example, the transmission information is transmitted in step 301 from the first network interface 103 of the apparatus 10 in the form of the radio signal 205 (e.g. a Bluetooth signal)

For example, the transmission information optionally comprises a signal strength indication, with the signal strength indication being dependent on the signal strength of the radio signal 205. For example, the radio signal 205 is transmitted at a constant signal strength. For example, the signal strength indication, as described above, indicates the signal strength and/or magnitude of the signal strength of the radio signal 205 with which the transmission information is transmitted. For example, the signal strength indication indicates the signal strength and/or magnitude of the signal strength of the radio signal 205 at a predefined distance from the apparatus 10 (e.g. at a distance of 5 in, preferably 3 m, particularly preferably 1 m). The signal strength of the radio signal 205 should, for example, be taken to mean the power of the radio signal 205 (e.g. the transmitting and/or receiving power of the radio signal).

The transmission information comprises, for example, a unique identifier of the apparatus 10 such as a Universally Unique Identifier.

The identifier is associated with the resource, for example, by way of an entry in a database. For example, an entry in the database comprises the resource and/or a reference to the resource in addition to the identifier.

For example, the database is a position database, which in an entry comprises position information about the position of the apparatus 10 in addition to the identifier of the apparatus 10. For example, the position database comprises one entry respectively for a large number of apparatuses, with the identifier of the apparatus and the position information about the position of the apparatus.

For example, the database is a reference database, which in an entry comprises a reference to the resource associated with the identifier of the apparatus in addition to the identifier of the apparatus 10. For example, the reference database comprises one entry respectively for a large number of apparatuses, with the identifier of the apparatus and a reference to the resource associated with the identifier of the apparatus.

The database is stored, for example, together with a database program in the program memory 111 of the mobile apparatus 1, in the program memory 113 of the server 13 and/or the program memory of the optional server 12 and is provided by the mobile apparatus 11, the server 13 and/or the optional server 12. The database program contains, for example, program instructions which cause an apparatus to provide the database when the database program is executed by one or more processor(s) of the apparatus.

Vicinity information about the vicinity is captured and/or vicinity information about the vicinity is obtained in an optional step 302.

For example, in step 302 at least one sensor connected to the optional data interface 105 captures vicinity information about the vicinity of the apparatus 10. For example, the at least one sensor forwards the vicinity information to the data interface 105, so the vicinity information is obtained in step 302 at the apparatus 10 via the data interface 105.

Examples of vicinity information about the vicinity of the apparatus 10 are temperature information, brightness information, motion information, sound information, audio information, image information, video information and/or vibration information.

It is conceivable, for example, for the vicinity information captured by the at least one sensor and obtained at the apparatus 10 to be optionally at least partially processed by the processor 100 of the apparatus 10. For example, the program memory 101 of the apparatus 10 comprises program instructions, with the program memory and the program instructions each being adapted, together with the processor 100, to cause the processor 100 to process the vicinity information (e.g. apply a processing algorithm such a compression, conditioning and/or evaluation algorithm to the vicinity information). However, it is also conceivable for the vicinity information obtained at the apparatus 10 to not be processed.

In an optional step 303 vicinity information about the vicinity is transmitted to the server 13.

For example, in step 303 vicinity information about the vicinity of the apparatus 10 is transmitted from the second optional network interface 104 of the apparatus 10 to the server 13. For example, in step 303 vicinity information about the vicinity of the apparatus 10 is transmitted from the second optional network interface 104 of the apparatus 10 to the server 13 via the connection 200.

The vicinity information transmitted to the server in step 303 is based, for example, at least partially on the vicinity information captured and/or obtained in step 302. For example, in step 303 the vicinity information captured and/or obtained in step 302 is at least partially transmitted to the server. However, it is, for example, also conceivable for the vicinity information (e.g. compressed, processed and/or evaluated vicinity information) optionally processed in step 302 to be at least partially transmitted to the server 13 in step 303.

Figure 4:
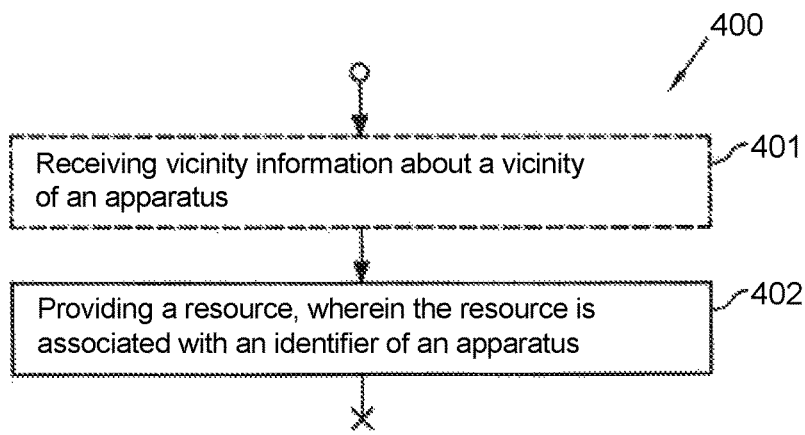
FIG. 4 shows a flow diagram with steps of an exemplary embodiment of the second method according to the invention.

FIG. 4 shows a flow diagram 400 with steps of an exemplary embodiment of the second method according to the invention, which are carried out and/or controlled by the means of the server 13 according to the invention.

In an optional step 401 vicinity information about the vicinity of the apparatus 10 is received at the server 13.

For example, in step 401 vicinity information about the vicinity of the apparatus 10 is received from the network interface 133 of the server 13 by the apparatus 10. For example, in step 401 vicinity information about the vicinity of the apparatus 10 is received from the network interface 133 of the server 13 via the connection 200 by the apparatus 10. For example, the vicinity information received in step 401 corresponds to the vicinity information transmitted in step 303 of the flow diagram 300.

In a step 402 a resource is provided, wherein the resource is associated with an identifier of the apparatus 10.

For example, in step 402 the resource is at least partially provided depending on the vicinity information received in optional step 401. For example, the server 13 according to the invention adapts the resource at least partially depending on the vicinity information. For example, if high temperatures (e.g. over 20° C.) are detected in the vicinity of the apparatus 10, the resource comprises different information to when low temperatures (e.g. below 20° C.) are detected in the vicinity of the apparatus 10.

The resource is, for example, a web page and is provided by the server 13 in such a way that the resource and/or the information incorporated by the resource can be accessed over the network 201. For example, the web page is provided by the server 13 in step 402 in such a way that the mobile apparatus 11 can access the resource and/or information incorporated by the resource via the connection 203, network 201 and connection 202. For example, the resource can be localised and/or identified in the network 201 by a URL For example, in step 402 a request for the resource (e.g. an HTTP GET request with the URL of the resource) is received by the apparatus 11 at the network interface 133 via the connection 202, network 201 and connection 203. For example, in response to the request for the resource the network interface 133 transmits the resource and/or information incorporated by the resource to the mobile apparatus 11 via the connection 202, network 201 and connection 203.

Figure 5A:
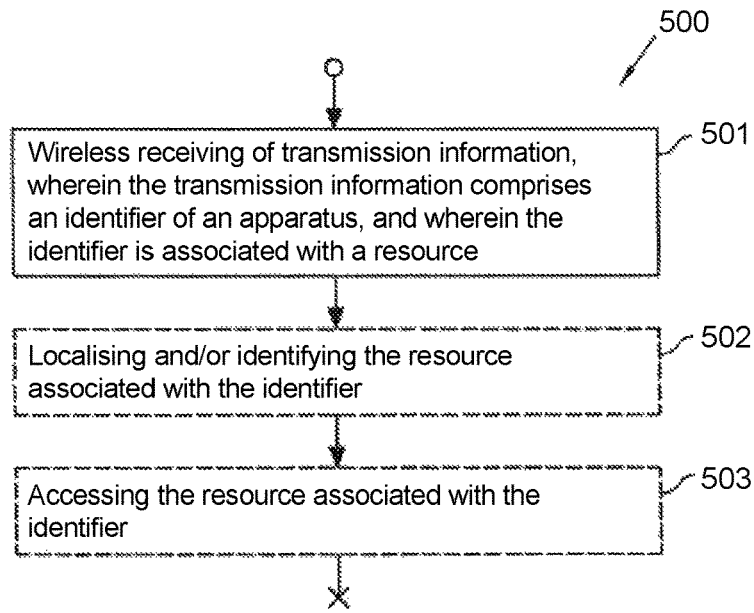
FIGS. 5a and 5b show flow diagrams with the steps of exemplary embodiments of the third method according to the invention.

FIG. 5a shows a flow diagram 500 with steps of an exemplary embodiment of the third method according to the invention, which are carried out and/or controlled by the means of the mobile apparatus 11 according to the invention.

In a step 501 transmission information is received wirelessly, wherein the transmission information comprises an identifier of the apparatus 10, and wherein the identifier is associated with a resource. For example, the transmission information is received in step 501 from the first network interface 113 of the apparatus 11 in the form of the radio signal 205 (e.g. a Bluetooth signal)

For example, in step 501 the transmission information transmitted in step 301 of the flow diagram 300 is received wirelessly.

In an optional step 502 the resource associated with the identifier is localised and/or identified.

As described above, the resource is associated, for example by way of an entry in a database, with the identifier. For example, the resource can be identified and/or localised in step 502 by a request with the identifier to a database. For example, the database is adapted in such a way that the database outputs on a reference to the resource associated with the identifier in response to request directed to the database.

For example, the database is provided by the optional server 12. However, it is also conceivable, for example, for the database to be provided by the server 13. If the database is provided by the optional server 12, in step 502 the second network interface 114 transmits, for example, a request with the identifier to the server 12 or database provided by the server 12. For example, the request with the identifier is transmitted in step 502 via the connection 203, network 201 and connection 204. For example, in step 502 the network interface 114 receives a reference to the resource associated with the identifier from the server 12 or from the database provided by the server 12 in response to the request with the identifier. For example, the network interface 114 receives the response in step 502 via the connection 203, network 201 and connection 204. An example of a reference is a URL of the resource.

The resource associated with the identifier is accessed in an optional step 503.

As described above, the resource is, for example, a web page and is provided by the server 13 in such a way that the resource and/or the information incorporated by the resource can be accessed over the network 201. For example, the web page is provided by the server 13 in step 402 of the flow diagram 400 in such a way that the mobile apparatus 11 can access the resource and/or information incorporated by the resource via the connection 203, network 201 and connection 202. For example, the resource can be localised and/or identified in the network 201 by way of a URL.

For example, in step 503 a request for the resource (for example an HTTP-GET request with the URL of the resource) is transmitted from the network interface 114 to the server 13 via the connection 203, network 201 and connection 202. For example, the resource and/or information incorporated by the resource is received in step 503 at the network interface 114 via the connection 202, network 201 and connection 203 from the server 13 in response to the request for the resource.

Subsequently, the resource and/or information incorporated by the resource is/are output, for example by the optional input/output means 115 to a user of the mobile apparatus 1. For example, the web page is displayed on a screen of the mobile apparatus 11.

Figure 5B:
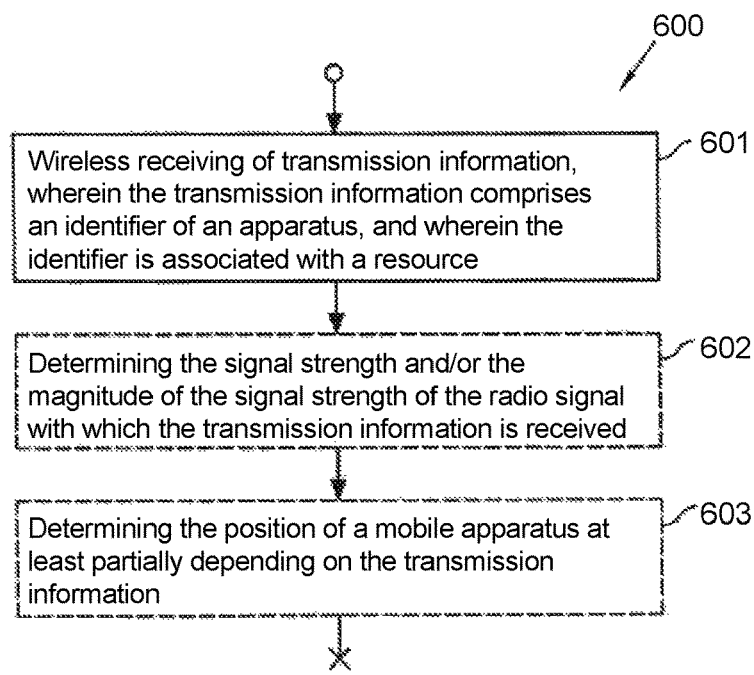

FIG. 5b shows a flow diagram 600 with steps of an exemplary embodiment of the third method according to the invention, which are carried out and/or controlled by the means of the mobile apparatus 11 according to the invention.

In a step 601 transmission information is received wirelessly, wherein the transmission information comprises an identifier of the apparatus 10, and wherein the identifier is associated with a resource. Step 601 corresponds, for example, to the above described step 501 of the flow diagram 500. In an optional step 602 the signal strength and/or the magnitude of the signal strength of the radio signal 205 is/are determined with which the transmission information is received in step 601. For example, the first network interface 113 is adapted to determine the signal strength and/or the magnitude of the signal strength of the radio signal 205 with which the transmission information is received in step 601. For example, the network interface comprises means for measuring the signal strength of a received radio signal.

In an optional step 603 the position of the mobile apparatus 11 is at least partially determined depending on the transmission information. For example, the program memory 111 of the mobile apparatus 11 comprises program instructions, with the program memory 11l and the program instructions each being adapted, together with the processor 110, to cause the processor 110 to determine the position of the mobile apparatus 11 at least partially depending on the transmission information.

As described above, the resource associated with the identifier of the apparatus can comprise, for example, position information about the position of the apparatus 10. Position information should, for example, be taken to mean information that enables the position of the apparatus 10 to be determined. For example, the position information comprises a position indication about the geographic position of the apparatus 10. An example of a position indication of this kind is an address of the apparatus 10 and/or geographical coordinates of the apparatus 10.

For example, the identifier of the apparatus 10 is included in an entry in a position database with the position information. For example, the entry and/or the position information in the position database can be identified and/or localised by the identifier of the apparatus 10. For example, the position information can be obtained in step 603 by a request with the identifier to the location database. For example, the position database is in this case adapted in such a way that the position database outputs the position information about the position of the apparatus 10 in response to a request with the identifier of the apparatus 10 directed to the position database. For example, the position database is provided by the mobile apparatus 11. However, it is also conceivable for the position database to be provided by the server 12 and/or server 13.

For example, the position of the mobile apparatus 11 is determined in step 603 at least partially depending on the position information that can be localised and/or identified by the identifier about the position of the apparatus 10. For example, the position of the mobile apparatus 11 is determined in such a way that the mobile apparatus 11 is at the position of the apparatus 10 and/or in the vicinity of the position of the apparatus 10. The vicinity is limited, for example, by the transmission range of the network interface 103 of the apparatus 10 and, for example, predefined accordingly.

As described above, the transmission information optionally comprises a signal strength indication. This signal strength indication can be used for a more accurate determination of the position of the mobile apparatus 11. For example, the position of the mobile apparatus 11 is determined in step 603 at least partially depending on the signal strength indication incorporated by the transmission information and by the signal strength determined in step 602 and/or the magnitude of the signal strength of the radio signal 205 determined in step 602. For example, the distance of the mobile apparatus 11 from the apparatus 10 is determined depending on the signal strength indication incorporated by the transmission information and by the signal strength determined in step 602 and/or the magnitude of the signal strength of the radio signal 205 determined in step 602. For example, the position of the mobile apparatus is determined in such a way that the mobile apparatus 11 is located at positions with a distance corresponding to the position of the apparatus 10 around the position of the apparatus 10. When radio signals are received with transmission information from other apparatuses according to the invention, the position of the mobile apparatus 11 can be restricted further accordingly.

Some exemplary embodiments of the invention are disclosed below:

1. Exemplary embodiment of the apparatus according to the invention, the apparatus comprising:
    one or more transmitting means, which are adapted to wirelessly transmit transmission information, with the transmission information comprising an identifier of the apparatus, and with the identifier being associated with a resource.
2. Exemplary embodiment of the inventive apparatus according to embodiment 1, the apparatus also comprising:
    at least one sensor which is adapted to capture information about the vicinity of the apparatus.
3. Exemplary embodiment of the inventive apparatus according to embodiment 2, with the at least one sensor being a temperature sensor, an ambient temperature sensor, a brightness sensor, a motion sensor, an acoustic sensor, a sound sensor, an ultrasound sensor, an optical sensor, an infrared sensor, a light sensor, an image sensor, a video sensor, a current sensor, a voltage sensor, a power sensor and/or a vibration sensor.
4. Exemplary embodiment of the inventive apparatus according to one of the embodiments 2 and 3, the apparatus also comprising:
    one or more communication means which are adapted to transmit information to a server, with the information being at least partially based on information about the vicinity of the apparatus.
5. Exemplary embodiment of the inventive apparatus according to embodiment 4, wherein the server provides the resource associated with the identifier.
6. Exemplary embodiment of the inventive apparatus according to any one of embodiments 1 to 5, wherein the transmitting means are adapted to transmit the transmission information according to a wireless communications protocol.
7. Exemplary embodiment of the inventive apparatus according to any one of embodiments 1 to 6, wherein the transmitting means are adapted to transmit the transmission information in the form of a radio signal, in particular in the form of a broadcast signal, a radio beacon signal, a beacon signal, a Bluetooth signal and/or an FCN signal.
8. Exemplary embodiment of the inventive apparatus according to any one of embodiments 1 to 7, wherein the transmitting means are adapted to transmit the transmission information at regular time intervals.
9. Exemplary embodiment of the inventive apparatus according to any one of embodiments 1 to 8, wherein the identifier is a unique identifier of the apparatus.
10. Exemplary embodiment of the inventive apparatus according to any one of embodiments 1 to 9, wherein the identifier is a Universally Unique Identifier.
11. Exemplary embodiment of the inventive apparatus according to any one of embodiments 1 to 10, wherein the identifier is associated with the resource by way of an entry in a database.
12. Exemplary embodiment of the inventive apparatus according to any one of embodiments 1 to 11, wherein the resource is a resource in a network.
13. Exemplary embodiment of the inventive apparatus according to any one of embodiments 1 to 12, wherein the resource is a web page.
14. Exemplary embodiment of the inventive apparatus according to any one of embodiments 1 to 13, wherein the apparatus is arrangeable or is arranged on or in a light outside, in particular a street light.
15. Exemplary embodiment of the inventive apparatus according to any one of embodiments 1 to 14, wherein the apparatus is part of an apparatus for controlling a lamp of a light outside, in particular a street light.
16. Exemplary embodiment of the inventive use of an apparatus according to any of embodiments 1 to 15 outside, in particular in or on a light outside, in particular in or on a street light.
17. Exemplary embodiment of the server according to the invention, the server comprising:
    one or more providing means, which are adapted to provide a resource, wherein the resource is associated with an identifier of an apparatus.
18. Exemplary embodiment of the inventive server according to the embodiment 17, the server further comprising
    one or more communication means which are adapted to receive information from an apparatus, with the information being based at least partially on information about the vicinity at the geographical position of the apparatus, wherein the providing means are adapted to provide the resource at least partially depending on the information received from the apparatus.

19. Exemplary embodiment of the system according to the invention, the system comprising:
   one or more apparatus(es) according to any one of embodiments 1 to 15,
   one or more server(s) according to either of embodiments 17 and 18.
20. Exemplary embodiment of the first method according to the invention, the method comprising:
   wireless transmitting of transmission information from an apparatus, wherein the transmission information comprise an identifier of the apparatus, and wherein the identifier is associated with a resource.
21. Exemplary embodiment of the first inventive method according to embodiment 20, the method further comprising:
   capturing information about the vicinity of the apparatus,
   transmitting information from the apparatus to a server, wherein the information are based at least partially on the captured information about the vicinity.
22. Exemplary embodiment of the second method according to the invention, the method comprising:
   providing a resource by a server, wherein the resource is associated with an identifier of an apparatus.
23. Exemplary embodiment of the second inventive method according to embodiment 22, the method further comprising:
   receiving information from the apparatus at the server, wherein the information is based at least partially on information about the vicinity of the apparatus, and
   providing the resource at least partially depending on the received information.
24. Exemplary embodiment of the third method according to the invention, the method comprising:
   wireless receiving of transmission information at a mobile apparatus, wherein the transmission information comprises an identifier of an apparatus, and wherein the identifier is associated with a resource,
   accessing the resource associated with the identifier by the mobile apparatus.
25. Exemplary embodiment of the computer program according to the invention, the computer program comprising:
   program instructions which cause an apparatus to carry out the steps of the method according to either of embodiments 20 and 21 or the steps of the method according to either of embodiments 22 and 23 or the steps of the method according to embodiment 24 when the computer program is executed by of one or more processors of the apparatus.

The sequence of the individual method steps in the individual flow diagrams is not imperative: unless stated otherwise alternative sequences of the steps are conceivable. The method steps can be implemented in various ways. An implementation in software (by way of program instructions), hardware or a combination of the two is therefore conceivable for implementing the method steps.

The exemplary embodiments of the present invention described in this specification shall also be disclosed in all combinations with one another. In particular, the description of a feature incorporated by an embodiment—unless explicitly stated to the contrary—should in the present case not be taken to mean that the feature is indispensable or essential to the operation of the embodiment. The sequence of method steps described in this specification in the individual flow diagrams is not imperative; alternative sequences of the method steps are conceivable. The method steps can be implemented in various ways, so an implementation in software (by way of program instructions), hardware or a combination of the two is conceivable for implementing the method steps. Terms used in the claims such as "comprise", "have", "include". "contain" and the like do not rule out additional elements or steps. The phrase "at least partially" covers both "partially" and "completely". The phrase "and/or" covers both "and" as well as "or". A plurality of units, persons, or the like means a plurality of units, people or the like in the context of this specification. The use of the indefinite article does not rule out a plurality. A single apparatus can carry out the functions of a plurality of the units or apparatuses mentioned in the claims. Reference numerals specified in the claims should not be regarded as limitations on the means and steps used.

The invention claimed is:

1. Apparatus comprising at least one processor and one memory having program instructions, the at least one memory and the program instructions, together with the at least one processor, being adapted to cause the apparatus to:
   wirelessly transmit transmission information, wherein the transmission information comprises an identifier of the apparatus, wherein the identifier is associated with a resource in such a way that the resource is at least one of identifiable and localisable by the identifier, wherein a server provides the resource associated with the identifier,
   at least one of capture vicinity information about a vicinity of the apparatus and obtaining vicinity information about the vicinity of the apparatus, and
   transmit the vicinity information about the vicinity of the apparatus over a network connection to the server,
   wherein the vicinity information is transmitted over a network connection in a first network from the apparatus to the server, and wherein the resource associated with the identifier is provided by the server in such a way that the resource associated with the identifier is retrievable over a second network.

2. Apparatus according to claim 1, wherein the resource is not provided by the apparatus.

3. Apparatus according to claim 1, wherein the transmission information is transmitted according to a wireless communications protocol.

4. Apparatus according to claim 1, wherein the transmission information is transmitted in the form of at least one of a broadcast signal, a radio beacon signal and a beacon signal.

5. Apparatus according to claim 4, wherein the transmission information also comprises a signal strength indication, wherein the signal strength indication depends on the signal strength of at least one of the broadcast signal, the radio beacon signal and the beacon signal.

6. Apparatus according to claim 1, wherein the transmission information is transmitted at regular intervals.

7. Apparatus according to claim 1, wherein the identifier is a unique identifier of the apparatus.

8. Apparatus according to claim 1, wherein the identifier is a Universally Unique Identifier.

9. Apparatus according to claim 1, wherein the identifier is associated with the resource by way of an entry in a database.

10. Apparatus according to claim 1, wherein the resource is a resource in a network.

11. Apparatus according to claim 1, wherein the resource comprises position information about at least one of the position of the apparatus and/or information dependent on the position of the apparatus and information dependent on the vicinity of the apparatus.

12. Apparatus according to claim 1, wherein the resource is a web page.

13. Apparatus according to claim 1, wherein the apparatus is arrangable or is arranged on or in a light outside, in particular a street light.

14. Apparatus according to claim 1, wherein the apparatus is part of an apparatus for controlling a lamp of a light outside, in particular a street light.

15. Apparatus according to claim 1, wherein the vicinity of the apparatus is limited by a transmission range within which the transmission information can be received.

16. Method, comprising:
- wireless transmitting of transmission information from an apparatus, wherein the transmission information comprises an identifier of the apparatus, wherein the identifier is associated with a resource in such a way that the resource is at least one of identifiable and localisable by the identifier, wherein a server provides the resource associated with the identifier,
- at least one of capturing vicinity information about a vicinity of the apparatus at the apparatus and obtaining vicinity information about the vicinity of the apparatus at the apparatus, and
- transmitting the vicinity information about the vicinity of the apparatus over a network connection from the apparatus to the server
- wherein the vicinity information is transmitted over a network connection in a first network from the apparatus to the server, and wherein the resource associated with the identifier is provided by the server in such a way that the resource associated with the identifier is retrievable over a second network.

17. Method, comprising:
- providing a resource by a server, wherein the resource is associated with an identifier of an apparatus in such a way that the resource is at least one of identifiable and localisable by the identifier,
- receiving vicinity information about the vicinity of the apparatus over a network connection from the apparatus at the server, and
- providing the resource by the server at least partially depending on the vicinity information
- wherein the vicinity information is transmitted over a network connection in a first network to the server, and wherein the resource associated with the identifier is provided by the server in such a way that the resource associated with the identifier is retrievable over a second network.

18. Server, comprising at least one processor and one memory having program instructions, the at least one memory and the program instructions, together with the at least one processor, being adapted to cause the server to:
- provide a resource, wherein the resource is associated with an identifier of an apparatus in such a way that the resource is at least one of identifiable and localisable by the identifier,
- receive vicinity information about the vicinity of the apparatus over a network connection from the apparatus, and
- provide the resource at least partially depending on the vicinity information, wherein the vicinity information is transmitted over a network connection in a first network to the server, and wherein the resource associated with the identifier is provided by the server in such a way that the resource associated with the identifier is retrievable over a second network.

\* \* \* \* \*